(12) United States Patent
Kodama et al.

(10) Patent No.: US 10,134,281 B2
(45) Date of Patent: Nov. 20, 2018

(54) COLLISION AVOIDANCE SYSTEM AND COLLISION AVOIDANCE METHOD

(71) Applicant: The Yokohama Rubber Co., LTD., Minato-ku, Tokyo (JP)

(72) Inventors: Yuji Kodama, Hiratsuka (JP); Koji Nakatani, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/539,648

(22) PCT Filed: Dec. 26, 2014

(86) PCT No.: PCT/JP2014/084572
§ 371 (c)(1),
(2) Date: Jun. 23, 2017

(87) PCT Pub. No.: WO2016/103466
PCT Pub. Date: Jun. 30, 2016

(65) Prior Publication Data
US 2017/0352272 A1 Dec. 7, 2017

(51) Int. Cl.
*G08G 1/16* (2006.01)
*G01C 21/26* (2006.01)
*G08G 1/0962* (2006.01)

(52) U.S. Cl.
CPC .......... *G08G 1/162* (2013.01); *G01C 21/26* (2013.01); *G08G 1/09626* (2013.01); *G08G 1/163* (2013.01); *G08G 1/166* (2013.01); *G08G 1/167* (2013.01)

(58) Field of Classification Search
None
See application file for complete search history.

(56) References Cited

U.S. PATENT DOCUMENTS

| 6,370,475 | B1 * | 4/2002 | Breed | B60N 2/2863 340/436 |
| 8,311,730 | B2 * | 11/2012 | Neff | B60W 40/02 701/1 |
| 9,428,186 | B2 * | 8/2016 | Breed | B60W 30/09 |

FOREIGN PATENT DOCUMENTS

| JP | 2001-255167 | 9/2001 |
| JP | 2011-221573 | 11/2011 |
| JP | 2014-013524 | 1/2014 |

OTHER PUBLICATIONS

International Search Report for International Application No. PCT/JP2014/084572 dated Mar. 3, 2015, 2 pages.

* cited by examiner

*Primary Examiner* — K. Wong
(74) *Attorney, Agent, or Firm* — Thorpe North & Western (57) ABSTRACT

Route information indicating a preset route is acquired. Host vehicle position information indicating the position of a host vehicle is acquired. It is detected whether a direction indicator providing advance notice of a traveling direction of the host vehicle is on or off. If the position of the host vehicle agrees with a position on the route, the position of the host vehicle approaches a position to turn on the route, and it is detected that the direction indicator is off, a warning operation pertaining to a warning directed at another vehicle traveling in the vicinity of the host vehicle is performed.

12 Claims, 10 Drawing Sheets

COLLISION AVOIDANCE SYSTEM AND COLLISION AVOIDANCE METHOD

TECHNICAL FIELD

The present technology relates to a collision avoidance system and a collision avoidance method.

BACKGROUND ART

Vehicles are driven along routes set with navigation devices in some cases. Japanese Unexamined Patent Application Publication No. 2001-255167A discloses a device that, if a direction indicator of a host vehicle is not activated at an intersection to turn on a route, announces to the driver of the host vehicle that the direction indicator should be activated.

A vehicle turning at an intersection or changing a lane without activating a direction indicator is dangerous, and a collision between the vehicle and a vehicle traveling in the vicinity of the vehicle needs to be avoided.

SUMMARY

The present technology provides a collision avoidance system and a collision avoidance method capable of increasing the likelihood of avoiding a collision between a vehicle that does not activate a direction indicator and a vehicle that travels in the vicinity of the vehicle.

A collision avoidance system according to an aspect of the present technology includes: a route information acquisition unit acquiring route information indicating a preset route; a host vehicle position acquisition unit acquiring host vehicle position information indicating a position of a host vehicle; a direction indicator detection unit detecting whether a direction indicator providing advance notice of a traveling direction of the host vehicle is on or off; a warning device performing a warning operation pertaining to a warning directed at another vehicle traveling in a vicinity of the host vehicle; and a control unit controlling the warning device on a basis of the information acquired by the route information acquisition unit and the host vehicle position acquisition unit and a detection result from the direction indicator detection unit. The control unit causes the warning device to perform the warning operation upon agreement of the position of the host vehicle with a position on the route, approach of the position of the host vehicle to a position to turn on the route, and detection of the direction indicator being off at the direction indicator detection unit.

The collision avoidance system may further include a distance measurement unit measuring a distance between the host vehicle and the other vehicle, and the control unit may cause the warning device not to perform the warning operation upon measurement of the distance being outside a predetermined range at the distance measurement unit.

Preferably, the other vehicle includes a following vehicle traveling behind the host vehicle.

The distance measurement unit may include a radar unit outputting a measurement signal based on a reflected wave of an electromagnetic wave emitted toward the other vehicle as a measurement result.

The distance measurement unit may include a photographing unit photographing the other vehicle and outputting an image signal based on an image photographed by the photographing unit as a measurement result.

The collision avoidance system may further include a steering angle detection unit detecting a steering angle of the host vehicle; and the control unit may control the warning device to perform the warning operation upon detection of the steering angle being equal to or greater than a predetermined value at the steering angle detection unit, and may control the warning device not to perform the warning operation upon detection of the steering angle being less than the predetermined value at the steering angle detection unit.

Preferably, the warning operation includes at least one of a predetermined display operation directed at the other vehicle and a predetermined sound outputting operation directed at the other vehicle.

The warning operation may include an operation of transmitting, to the other vehicle, a signal activating another warning device provided in the other vehicle.

A collision avoidance method according to an aspect of the present technology includes the steps of: acquiring route information indicating a preset route; acquiring host vehicle position information indicating a position of a host vehicle; detecting whether a direction indicator providing advance notice of a traveling direction of the host vehicle is on or off; and performing a warning operation pertaining to a warning directed at another vehicle traveling in a vicinity of the host vehicle upon agreement of the position of the host vehicle with a position on the route, approach of the position of the host vehicle to a position to turn on the route, and detection of the direction indicator being off.

According to the collision avoidance system and the collision avoidance method of the present technology, a vehicle turning at an intersection or changing a lane without activating a direction indicator of the vehicle makes a warning to another vehicle in the vicinity of the vehicle. This configuration enables an appropriate distance to be maintained between both vehicles, resulting in an increase of the likelihood of avoiding a collision.

DETAILED DESCRIPTION

Embodiments of the present technology are described in detail below with reference to the drawings. However, the present technology is not limited by the embodiments. Furthermore, constituents of the embodiments include elements that may be easily replaced by those skilled in the art or that are substantially identical to constituents of the embodiment. In addition, some of the constituents may not be used in some cases.

First Embodiment

Figure 1:
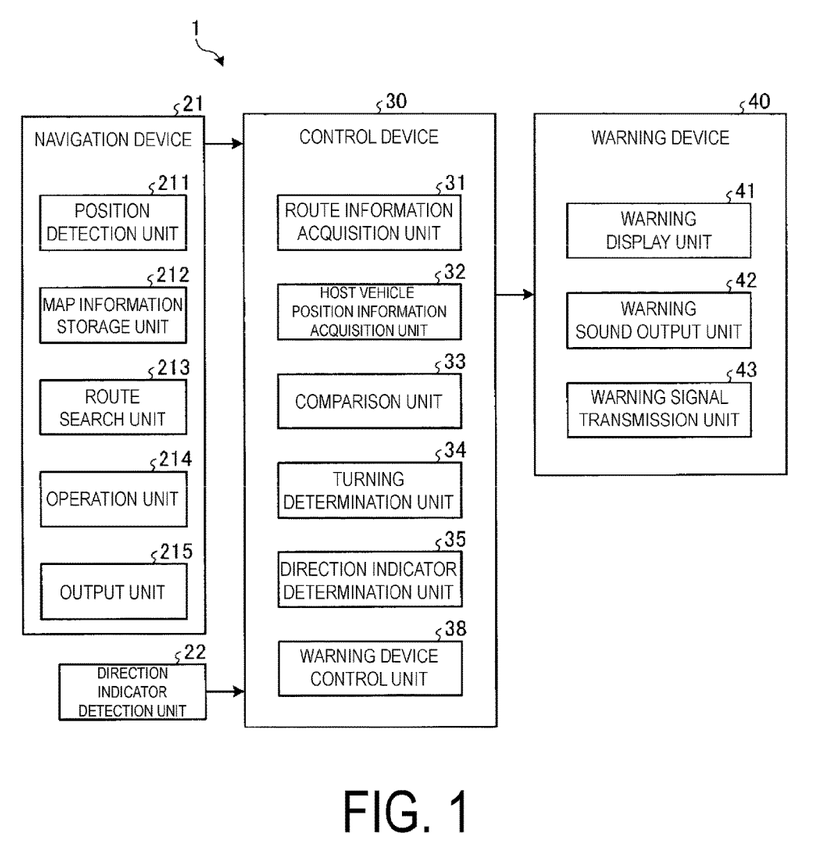
FIG. 1 is a function block diagram of a collision avoidance system according to a first embodiment.

FIG. 1 is a function block diagram of a collision avoidance system according to a first embodiment. As illustrated in FIG. 1, the collision avoidance system 1 according to the present embodiment is provided in a vehicle and includes a navigation device 21, a direction indicator detection unit 22, a control device 30, and a warning device 40.

The navigation device 21 can preset a route to be traveled by a host vehicle and guides the host vehicle on the basis of the set route. The navigation device 21 includes a position detection unit 211, a map information storage unit 212 storing map information, a route search unit 213 searching for a route, an operation unit 214 operated by a user, and an output unit 215, such as a display device and speaker. The position detection unit 211 acquires current position information of the host vehicle through the Global Positioning System (GPS).

The navigation device 21 has functions to search for a route from the position of the host vehicle to a destination with the route search unit 213, to display the route on a map, and to provide a route guide to the destination. When a driver inputs a desired destination with the operation unit 214, the navigation device 21 searches the map information stored in the map information storage unit 212 for a route considered optimal from the current position of the host vehicle to the destination and sequentially stores nodes (geographic coordinates) composing the searched route in a storage unit (not illustrated). The navigation device 21 then detects the position of the host vehicle during travel of the host vehicle, searches the node sequence stored in the storage unit for a route within a map display area on a display screen of the display device, and displays the route in such a manner that the route can be distinguished from other roads.

Furthermore, when the position of the host vehicle get close to within a predetermined distance from an intersection, the navigation device 21 displays a guide view of the intersection (for example, an enlarged view of the intersection, an arrow indicating the traveling direction at the intersection, the name of the intersection, and a landmark in the vicinity of the intersection) on the display screen. When the host vehicle approaches an intersection to turn, a position to change a lane, or a point of joining another road on the set route in relation to the traveling situation of the host vehicle, the navigation device 21 provides a guide about the traveling direction of the host vehicle with a voice message, screen display, or the like. When the host vehicle approaches an intersection to turn, the navigation device 21 outputs guide voice for the intersection saying, for example, "In 300 m, turn right" or "Turn right soon", from a speaker (not illustrated).

The direction indicator detection unit 22 detects whether a direction indicator (not illustrated) of the host vehicle is on or off. The direction indicator is for indicating an intention of the user to turn or change lane. The direction indicator is turned on by the driver and turned off automatically when the steering wheel turned clockwise or counterclockwise returns to a neutral position or by the driver.

The control device 30 controls the warning device 40 on the basis of the route information and host vehicle position information acquired by the navigation device 21 and a detection result of the direction indicator detection unit 22. If the position of the host vehicle agrees with a position on the route indicated by the route information, and the position of the host vehicle approaches a position to turn on the route, when the direction indicator detection unit 22 detects that the direction indicator is off, the control device 30 controls the warning device 40 to perform a warning operation.

The control device 30 includes a route information acquisition unit 31, a host vehicle position information acquisition unit 32, a comparison unit 33, a turning determination unit 34, a direction indicator determination unit 35, and a warning device control unit 38.

The route information acquisition unit 31 acquires the route information indicating the preset route from the navigation device 21.

The host vehicle position information acquisition unit 32 acquires the host vehicle position information indicating the current position of the host vehicle from the navigation device 21. The host vehicle position information may be acquired with, for example, the GPS, instead of from the navigation device 21.

The comparison unit 33 compares the route information acquired by the route information acquisition unit 31 with the current position of the host vehicle. If the position of the host vehicle agrees with a position on the route, the comparison unit 33 determines that the host vehicle is traveling along the route.

The turning determination unit 34 determines whether the host vehicle will turn soon on the basis of the route information acquired by the route information acquisition unit 31 and the host vehicle position information acquired by the host vehicle position information acquisition unit 32. Specifically, the turning determination unit 34 determines whether the position of the host vehicle approaches a position to turn on the route. If the position of the host vehicle is within a predetermined distance (for example, 15 m) from a position to turn on the route, for example, the turning determination unit 34 determines that the position of the host vehicle approaches the position to turn.

The position to turn is determined on the basis of the route indicated by the route information and the position of the host vehicle, and is a position where the host vehicle should be operated with an indication of intention using the direction indicator, that is, a position to change a lane or to turn right or left on the route, among intersections, points to split roads, points to joining other roads, exits of limited-access roads, junctions, and the like. Furthermore, the position to turn is a position, determined by the turning determination unit 34, in which the direction indicator should be operated to travel along the route.

The timing at which the direction indicator should be operated depends on the situation. For example, if the vehicle approaches an intersection to turn, the timing is 30 m before the intersection. If the vehicle approaches a position to change a lane, the timing is three seconds before changing a lane. If the vehicle approaches a point of joining another road, the timing is before the point. Thus, the predetermined distance may be adjusted depending on the situation.

The direction indicator determination unit 35 determines whether the direction indicator of the host vehicle is on or off on the basis of a detection result of the direction indicator detection unit 22.

The warning device control unit 38 controls the warning device 40 to perform a warning operation pertaining to a warning directed at another vehicle traveling in the vicinity of the host vehicle.

The warning device 40 performs the warning operation pertaining to a warning directed at the other vehicle traveling in the vicinity of the host vehicle. The warning device 40 includes a warning display unit 41, a warning sound output unit 42, and a warning signal transmission unit 43.

The warning display unit 41 makes a warning by lighting a lamp, displaying an image, or the like, for example. Here, the lamp is not limited to a lamp originally provided in the vehicle to satisfy traffic regulations. In addition to lighting the lamp, the lamp may be flashed (for example, brake lamps may be flashed). The display of the image is carried out by displaying a predetermined message in a display device using known LEDs, a liquid crystal display, or the like, for example. The warning sound output unit 42 makes a warning by outputting a warning sound. The warning sound includes synthesized voice. The warning signal transmission unit 43 wirelessly transmits a warning signal for causing another warning device provided in another vehicle such as a following vehicle to operate to that vehicle. The vehicle that received the warning signal from the warning signal transmission unit 43 operates the warning device provided in that vehicle and makes a warning to the driver of that vehicle.

Figure 2:
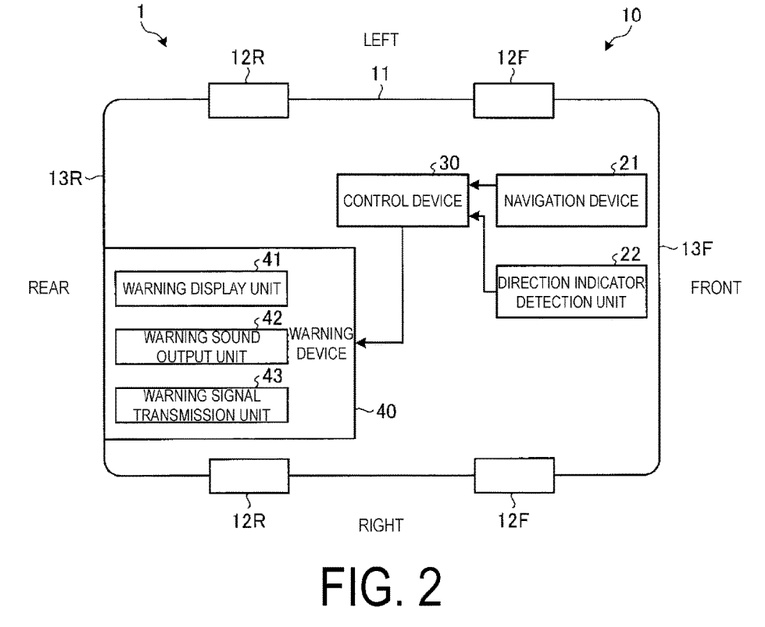
FIG. 2 is a schematic diagram of an example of a vehicle provided with the collision avoidance system according to the first embodiment.

FIG. 2 is a schematic diagram of an example of a vehicle provided with the collision avoidance system according to the present embodiment. As illustrated in FIG. 2, the host vehicle 10 is a four-wheeled vehicle in the present embodiment. The host vehicle 10 has two front wheels 12F and two rear wheels 12R. The host vehicle 10 has a driver cab that a driver occupies.

Figure 3:
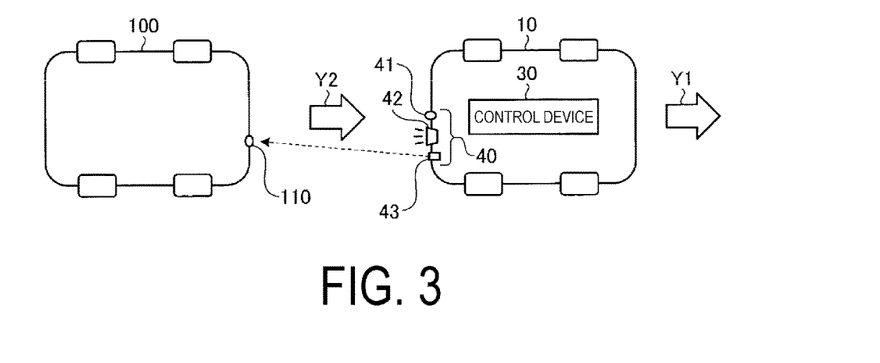
FIG. 3 is a schematic diagram of operations performed by the collision avoidance system illustrated in FIGS. 1 and 2.

FIG. 3 is a schematic diagram of operations performed by the collision avoidance system according to the present embodiment. In FIG. 3, the host vehicle 10 travels in the direction of the arrow Y1, and a following vehicle 100 travels in the direction of the arrow Y2.

In the host vehicle 10, the control device 30 activates the warning device 40, and the warning device 40 performs the warning operation. The warning operation performed by the warning device 40 is at least one of a warning by lighting a lamp or displaying an image by the warning display unit 41, a warning by outputting a warning sound by the warning sound output unit 42, and a warning using the warning device in another vehicle through transmitting a warning signal from the warning signal transmission unit 43.

The warning by lighting a lamp or displaying an image by the warning display unit 41 appeals to the sense of sight of the driver of the following vehicle 100.

The warning by outputting a warning sound by the warning sound output unit 42 appeals to the sense of hearing of the driver of the following vehicle 100.

The warning signal transmitted from the warning signal transmission unit 43 is received by a warning signal reception unit 110 of the following vehicle 100. This operation enables a warning appealing to the sense of sight or hearing of the driver in the following vehicle 100.

Such warnings may be made to a vehicle traveling on the left or right side (including diagonally forward and backward areas) of the host vehicle 10 in addition to the following vehicle 100. The following vehicle 100 or the vehicle traveling on the left or right side (including diagonally forward and backward areas) of the host vehicle 10 may make a warning to another vehicle traveling further behind.

Figure 4:
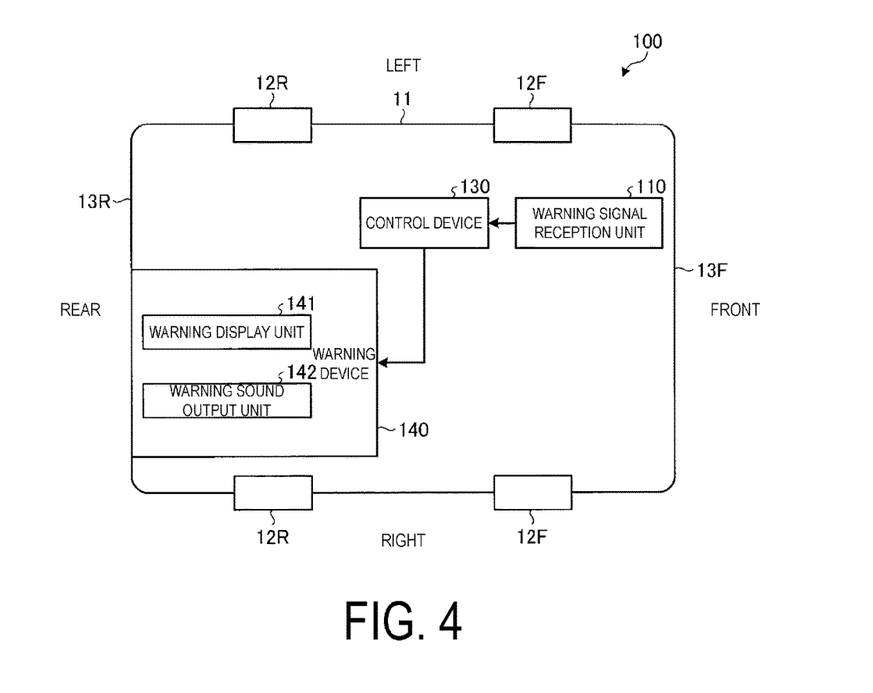
FIG. 4 is a schematic diagram of an example of another vehicle traveling in the vicinity of a host vehicle provided with the collision avoidance system according to the embodiment.

FIG. 4 is a schematic diagram of an example of another vehicle traveling in the vicinity of the host vehicle provided with the collision avoidance system according to the present embodiment. FIG. 4 illustrates an example in which the other vehicle is a following vehicle.

As illustrated in FIG. 4, the following vehicle 100 is a four-wheeled vehicle in the present embodiment. The following vehicle 100 has two front wheels 12F and two rear wheels 12R. The following vehicle 100 has a driver cab that a driver occupies. The following vehicle 100 includes a warning signal reception unit 110, a control device 130, and a warning device 140 that are disposed in a vehicle body 11.

The warning signal reception unit 110 is disposed in a front part 13F of the vehicle body 11 and receives the warning signal transmitted from the host vehicle 10 in FIG. 3. Upon receiving the warning signal, the warning signal reception unit 110 activates the control device 130.

The control device 130 activated by the warning signal reception unit 110 controls the warning device 140 to make a warning to the driver of the following vehicle 100.

The warning device 140 is disposed in a rear part 13R of the vehicle body 11 and includes a warning display unit 141 and a warning sound output unit 142. The warning display unit 141 makes a warning by lighting a lamp, displaying an image, or the like, to the driver of the following vehicle 100. The warning sound output unit 142 makes a warning by outputting a warning sound, to the driver of the following vehicle 100. The warning sound includes synthesized voice.

Operations of the collision avoidance system according to the present embodiment will now be described. First, route information indicating a route to be traveled by the host vehicle is set with the navigation device 21. The route information acquisition unit 31 then acquires the set route information from the navigation device 21. The host vehicle position information acquisition unit 32 acquires host vehicle position information from the navigation device 21.

The comparison unit 33 compares the route information acquired by the route information acquisition unit 31 with the host vehicle position information acquired by the host vehicle position information acquisition unit 32. If the host vehicle position information agrees with a position on the route as a result of the comparison at the comparison unit 33, it can be determined that the host vehicle is traveling along the route.

Next, the turning determination unit 34 determines whether the host vehicle approaches a position to turn. If the turning determination unit 34 determines that the host vehicle approaches a position to turn, the direction indicator determination unit 35 determines whether the direction indicator of the host vehicle is on or off on the basis of a detection result from the direction indicator detection unit 22.

If the direction indicator determination unit 35 determines that the direction indicator of the host vehicle is not on (is off), the warning device control unit 38 activates the warning device 40. This operation allows the warning device 40 to make a warning to another vehicle in the vicinity of the host vehicle. In contrast, if the direction indicator determination unit 35 determines that the direction indicator of the host vehicle is on, the warning device control unit 38 does not activate the warning device 40. Thus, the warning device 40 does not make a warning.

If the driver of the host vehicle does not activate the direction indicator in spite of approaching a position to turn on the route, these operations enable waning to the other vehicle in the vicinity of the host vehicle. It can thus be expected that the driver of the other vehicle, such as a following vehicle, steps on the brake or accelerator or turns the steering wheel, resulting in avoidance of collision.

Second Embodiment

Figure 5:
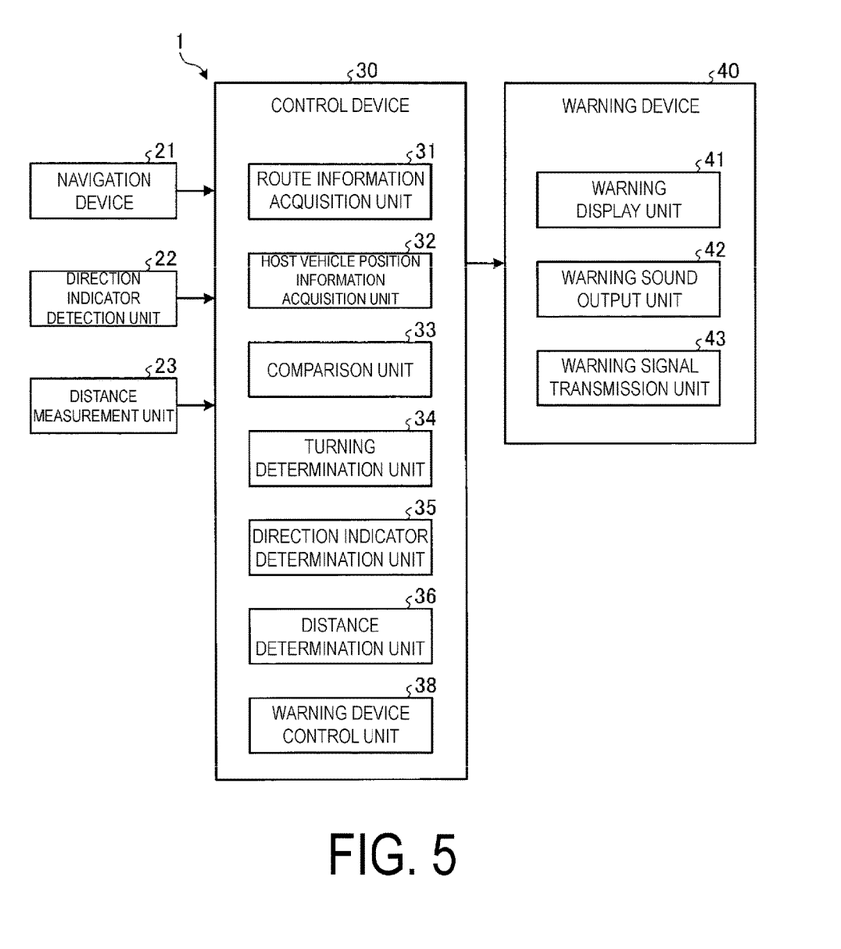
FIG. 5 is a function block diagram of a collision avoidance system according to a second embodiment.

FIG. 5 is a function block diagram of a collision avoidance system according to a second embodiment. The collision avoidance system 1 according to the present embodiment illustrated in FIG. 5 has the same configuration as that of the collision avoidance system according to the first embodiment described with reference to FIGS. 1 and 2 and further includes a distance measurement unit 23 and a distance determination unit 36. The navigation device 21 has the same configuration as that described above with reference to FIG. 1.

The distance measurement unit 23 measures a distance between a vehicle (host vehicle) and another vehicle traveling in the vicinity of the host vehicle in a non-contact manner. The vehicle traveling in the vicinity of the host vehicle is, for example, one or both of a following vehicle traveling behind the host vehicle and a vehicle traveling on a side (left or right side) of the host vehicle. In addition to a vehicle traveling directly behind the host vehicle, the following vehicle, as a subject of measurement at the distance measurement unit 23, may be, for example, a vehicle traveling diagonally backward. The vehicle traveling on a side, as the subject of measurement at the distance measurement unit 23, may be, for example, a vehicle traveling diagonally forward. The distance measurement unit 23 performs the measurement at predetermined cycles (for example, every second).

The distance measurement unit 23 includes a radar device (a millimeter wave radar device, a Doppler radar device). The radar device can measure a distance between the host vehicle and the other vehicle by emitting radio waves (or ultrasonic waves) and then receive the radio waves (or ultrasonic waves) reflected by an object. Note that the distance measurement unit 23 may include at least one of a laser scanner and a three-dimensional rangefinder. The distance measurement unit 23 may include an image capture device (a camera) capable of detecting an object in a non-contact manner by acquiring an optical image of the object. The distance measurement unit 23 including the image capture device may measure a distance on the basis of the acquired image. For example, the distance between the host vehicle and the other vehicle can be acquired on the basis of the size of the other vehicle in the acquired image. The distance measurement unit 23 performs the measurement at predetermined cycles (for example, every second).

The distance determination unit 36 determines whether the distance between the host vehicle and the other vehicle traveling in the vicinity of the host vehicle, measured by the distance measurement unit 23 is within a predetermined range (for example, within 20 m). If the distance between the host vehicle and the other vehicle measured by the distance measurement unit 23 is within the predetermined range (for example, within 20 m), the distance determination unit 36 activates the warning device control unit 38. The warning device control unit 38 causes the warning device 40 to make a warning.

If the distance between the host vehicle and the other vehicle measured by the distance measurement unit 23 is not within the predetermined range (is outside the predetermined range) (for example, exceeds 20 m), the distance determination unit 36 does not activate the warning device control unit 38. Thus, the warning device 40 does not make a warning.

Figure 6:
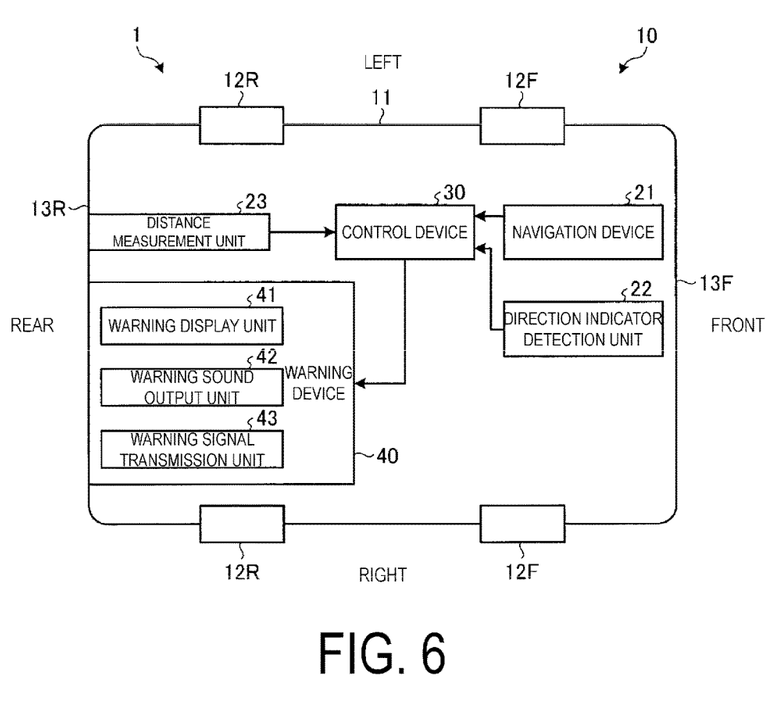
FIG. 6 is a schematic diagram of an example of a vehicle provided with the collision avoidance system according to the second embodiment.

FIG. 6 is a schematic diagram of an example of a vehicle provided with the collision avoidance system according to the present embodiment. As illustrated in FIG. 6, a vehicle body 11 according to the present embodiment has the same configuration as that described with reference to FIG. 2 and further includes the distance measurement unit 23. That is, a host vehicle 10 includes the distance measurement unit 23 disposed in a rear part 13R of the vehicle body 11. The distance measurement unit 23 can thus detect a distance from the host vehicle 10 to a following vehicle traveling behind the host vehicle 10 in a non-contact manner. In addition to a vehicle traveling directly behind the host vehicle 10, the distance measurement unit 23 may detect a distance to, for example, a vehicle traveling diagonally backward or on a side in a non-contact manner.

The other vehicle traveling in the vicinity of the host vehicle 10, such as a following vehicle, has the same configuration as that described above with reference to FIGS. 3 and 4.

Operations of the collision avoidance system according to the present embodiment will now be described. First, route information indicating a route to be traveled by the host vehicle is set with the navigation device 21. The route information acquisition unit 31 then acquires the set route information from the navigation device 21. The host vehicle position information acquisition unit 32 acquires host vehicle position information from the navigation device 21.

The comparison unit 33 compares the route information acquired by the route information acquisition unit 31 with the host vehicle position information acquired by the host vehicle position information acquisition unit 32. If the host vehicle position information agrees with a position on the route as a result of the comparison at the comparison unit 33, it can be determined that the host vehicle is traveling along the route.

Next, the turning determination unit 34 determines whether the host vehicle approaches a position to turn. If the turning determination unit 34 determines that the host vehicle approaches a position to turn, the direction indicator determination unit 35 determines whether the direction indicator of the host vehicle is on or off on the basis of a detection result from the direction indicator detection unit 22.

If the direction indicator determination unit 35 determines that the direction indicator of the host vehicle is not on (is off), the distance determination unit 36 determines whether the distance between the host vehicle and the other vehicle traveling in the vicinity of the host vehicle, measured by the distance measurement unit 23, is within a predetermined range.

If the distance determination unit 36 determines that the distance between the host vehicle and the other vehicle traveling in the vicinity of the host vehicle is within the predetermined range, the warning device control unit 38 activates the warning device 40. This operation allows the warning device 40 to make a warning to the other vehicle in the vicinity of the host vehicle. In contrast, if the distance determination unit 36 determines that the distance between the host vehicle and the other vehicle traveling in the vicinity of the host vehicle is not within the predetermined range (exceeds the predetermined range), the warning device control unit 38 does not activate the warning device 40. In this case, the warning device 40 does not make a warning.

If the driver of the host vehicle does not activate the direction indicator in spite of approaching a position to turn on the route, and the distance between the host vehicle and the other vehicle traveling in the vicinity of the host vehicle is within the predetermined range, these operations enable waning to the other vehicle. It can thus be expected that the driver of the other vehicle, such as a following vehicle, steps on the brake or accelerator or turns the steering wheel, resulting in avoidance of collision.

The collision avoidance system according to the second embodiment considers that a collision hardly occurs in the case where the distance between the host vehicle and the other vehicle exceeds the predetermined range (is outside the predetermined range), which differs from the first embodiment. Since a warning is not required in this case, the warning device 40 does not make a warning. Thus, making of unnecessary warning can be prevented.

Third Embodiment

Figure 7:
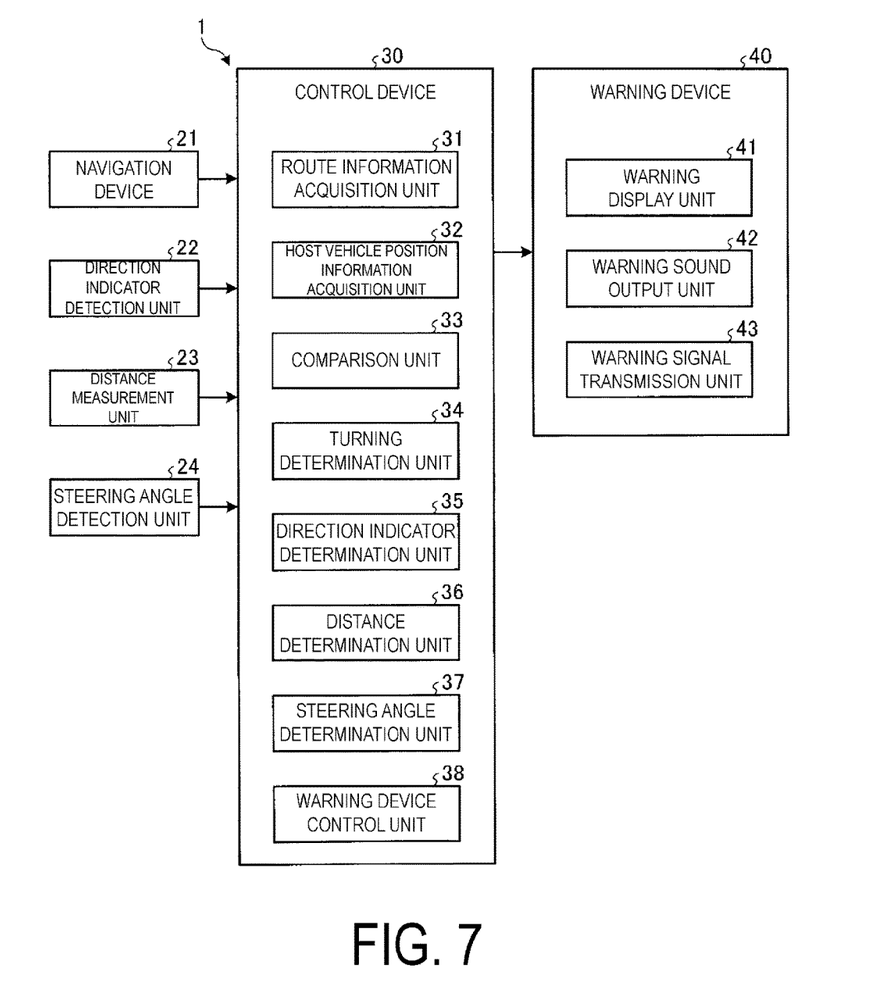
FIG. 7 is a function block diagram of a collision avoidance system according to a third embodiment.

FIG. 7 is a function block diagram of a collision avoidance system according to a third embodiment. The collision avoidance system 1 according to the present embodiment illustrated in FIG. 7 has the same configuration as that of the collision avoidance system according to the second embodiment described with reference to FIGS. 5 and 6 and further includes a steering angle detection unit 24 and a steering angle determination unit 37. The navigation device 21 has the same configuration as that described above with reference to FIG. 1.

The steering angle detection unit 24 detects a steering angle of a host vehicle and outputs steering angle information. The steering angle is a rotational angle of a steering wheel. The steering angle is zero degree when the steering wheel is in a neutral position.

The steering angle determination unit 37 determines whether the steering angle of the host vehicle detected by the steering angle detection unit 24 is equal to or greater than a predetermined value (for example, 30 degrees or greater clockwise or counterclockwise from the neutral position of the steering wheel).

Figure 8:
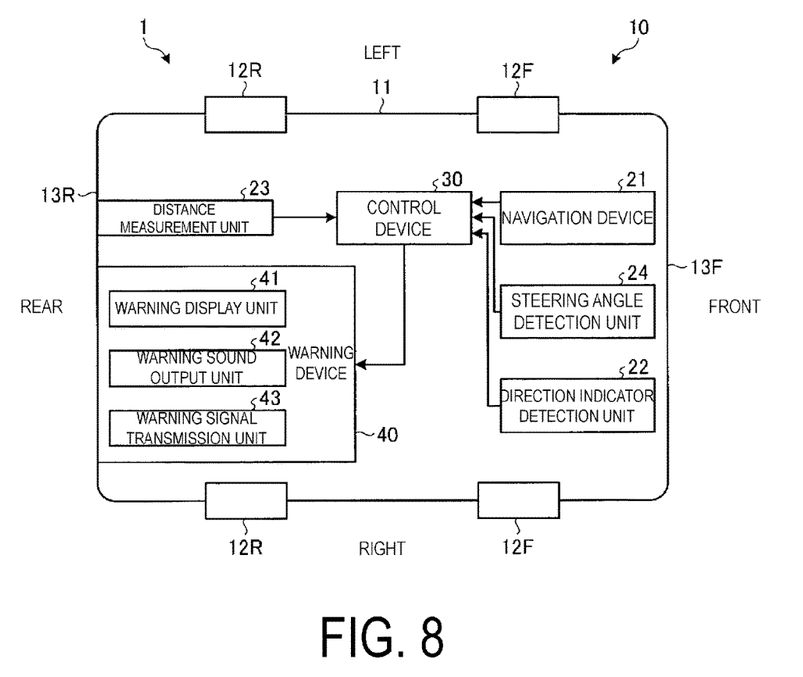
FIG. 8 is a schematic diagram of an example of a vehicle provided with the collision avoidance system according to the third embodiment.

FIG. 8 is a schematic diagram of an example of a vehicle provided with the collision avoidance system according to the present embodiment. As illustrated in FIG. 8, a vehicle body 11 according to the present embodiment has the same configuration as that described with reference to FIG. 6 and further includes the steering angle detection unit 24. That is, a host vehicle 10 includes the steering angle detection unit 24 disposed in the vicinity of the steering wheel of the vehicle body 11. The steering angle detection unit 24 can thus detect a steering angle of the host vehicle 10, and if the detected steering angle of the host vehicle 10 is equal to or greater than a predetermined value, a warning can be made by activate the warning device 40.

Another vehicle traveling in the vicinity of the host vehicle 10, such as a following vehicle, has the same configuration as that described above with reference to FIGS. 3 and 4.

Operations of the collision avoidance system according to the present embodiment will now be described. First, route information indicating a route to be traveled by the host vehicle is set with the navigation device 21. The route information acquisition unit 31 then acquires the set route information from the navigation device 21. The host vehicle position information acquisition unit 32 acquires host vehicle position information from the navigation device 21.

The comparison unit 33 compares the route information acquired by the route information acquisition unit 31 with the host vehicle position information acquired by the host vehicle position information acquisition unit 32. If the host vehicle position information agrees with a position on the route as a result of the comparison at the comparison unit 33, it can be determined that the host vehicle is traveling along the route.

Next, the turning determination unit 34 determines whether the host vehicle approaches a position to turn. If the turning determination unit 34 determines that the host vehicle approaches a position to turn, the direction indicator determination unit 35 determines whether the direction indicator of the host vehicle is on or off on the basis of a detection result from the direction indicator detection unit 22.

If the direction indicator determination unit 35 determines that the direction indicator of the host vehicle is not on (is off), the distance determination unit 36 determines whether the distance between the host vehicle and the other vehicle traveling in the vicinity of the host vehicle, measured by the distance measurement unit 23 is within a predetermined range.

If the distance determination unit 36 determines that the distance between the host vehicle and the other vehicle traveling in the vicinity of the host vehicle is within the predetermined range, the steering angle determination unit 37 determines whether the steering angle of the host vehicle detected by the steering angle detection unit 24 is equal to or greater than a predetermined value.

If the steering angle determination unit 37 determines that the steering angle of the host vehicle is equal to or greater than the predetermined value, the warning device control unit 38 activates the warning device 40. This operation allows the warning device 40 to make a warning to the other vehicle in the vicinity of the host vehicle. In contrast, if the steering angle determination unit 37 determines that the steering angle of the host vehicle is less than the predetermined value, the warning device control unit 38 does not activate the warning device 40. Thus, the warning device 40 does not make a warning.

If the driver of the host vehicle does not activate the direction indicator in spite of approaching a position to turn on the route, the distance between the host vehicle and the other vehicle traveling in the vicinity of the host vehicle is within the predetermined range, and the steering angle of the host vehicle is equal to or greater than the predetermined value, these operations enable waning to the other vehicle. It can thus be expected that the driver of the other vehicle, such as a following vehicle, steps on the brake or accelerator or turns the steering wheel, resulting in avoidance of collision.

The collision avoidance system according to the third embodiment considers that a collision hardly occurs in the case where the distance between the host vehicle and the other vehicle exceeds the predetermined range, which differs from the first embodiment. Since a warning is not required in this case, the warning device 40 does not make a warning. Thus, making of unnecessary warning can be prevented.

The collision avoidance system according to the third embodiment considers that a collision due to not activating the direction indicator hardly occurs in the case where the steering angle of the host vehicle does not exceed the predetermined value (is less than the predetermined value), which differs from the second embodiment. Since a warning is not required in this case, the warning device 40 does not make a warning. Thus, making of unnecessary warning can be prevented.

Fourth Embodiment

Figure 9:
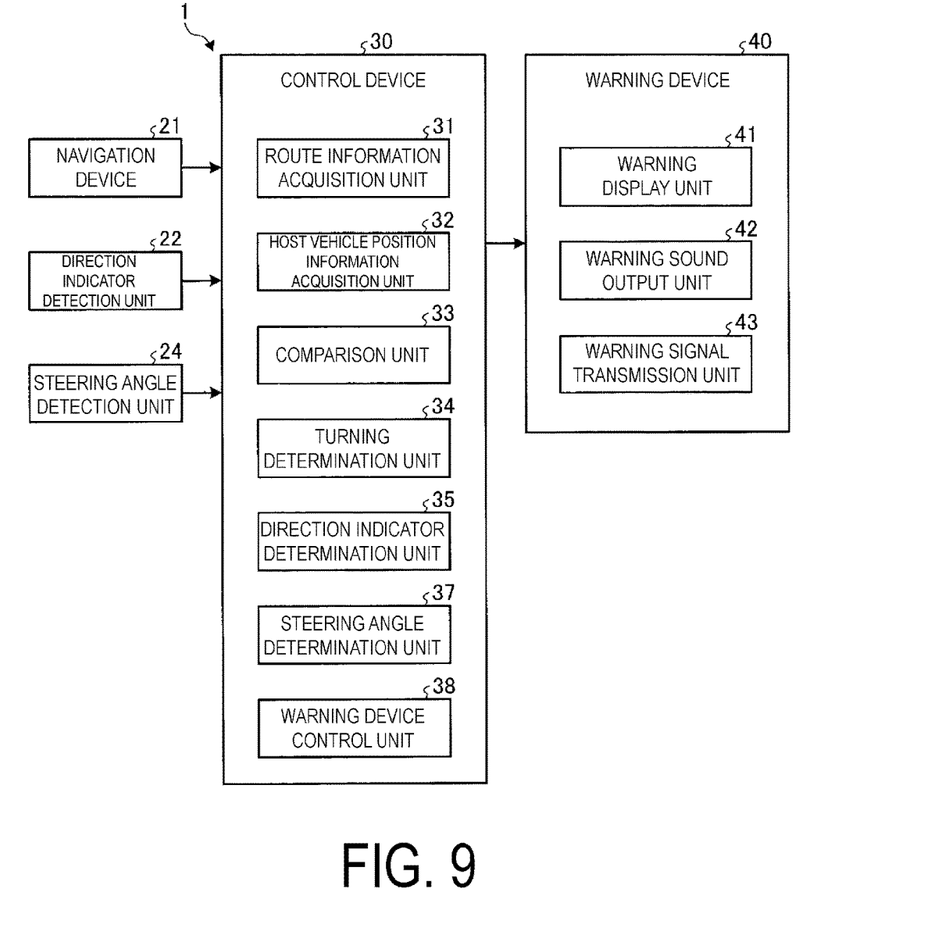
FIG. 9 is a function block diagram of a collision avoidance system according to a fourth embodiment.
Figure 10:
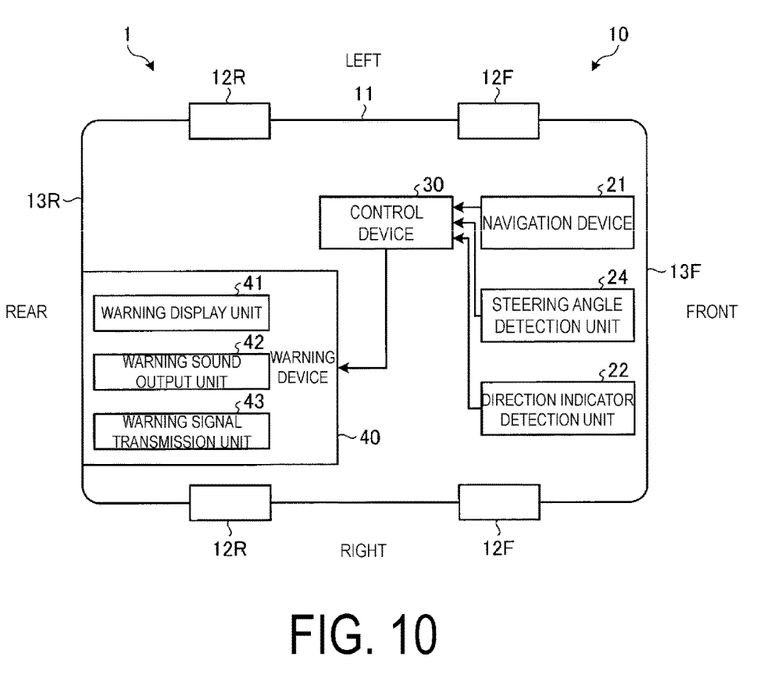
FIG. 10 is a schematic diagram of an example of a vehicle provided with the collision avoidance system according to the fourth embodiment.

FIG. 9 is a function block diagram of a collision avoidance system according to a fourth embodiment. FIG. 10 is a schematic diagram of an example of a vehicle provided with the collision avoidance system according to the present embodiment. The collision avoidance system 1 according to the present embodiment illustrated in FIGS. 9 and 10 has the same configuration as that of the collision avoidance system according to the first embodiment described with reference to FIGS. 1 and 2 and further includes the steering angle detection unit 24 and the steering angle determination unit 37.

The steering angle detection unit 24 and the steering angle determination unit 37 have the same configuration as that described above with reference to FIGS. 7 and 8. Another vehicle traveling in the vicinity of a host vehicle 10, such as a following vehicle, has the same configuration as that described above with reference to FIGS. 3 and 4. The navigation device 21 has the same configuration as that described above with reference to FIG. 1.

Operations of the collision avoidance system according to the present embodiment will now be described. First, route information indicating a route to be traveled by the host vehicle is set with the navigation device 21. The route information acquisition unit 31 then acquires the set route information from the navigation device 21. The host vehicle position information acquisition unit 32 acquires host vehicle position information from the navigation device 21.

The comparison unit 33 compares the route information acquired by the route information acquisition unit 31 with the host vehicle position information acquired by the host vehicle position information acquisition unit 32. If the host vehicle position information agrees with a position on the route as a result of the comparison at the comparison unit 33, it can be determined that the host vehicle is traveling along the route.

Next, the turning determination unit 34 determines whether the host vehicle approaches a position to turn. If the turning determination unit 34 determines that the host vehicle approaches a position to turn, the direction indicator determination unit 35 determines whether the direction indicator of the host vehicle is on or off on the basis of a detection result from the direction indicator detection unit 22.

If the direction indicator determination unit 35 determines that the direction indicator of the host vehicle is not on (is off), the steering angle determination unit 37 determines whether the steering angle of the host vehicle detected by the steering angle detection unit 24 is equal to or greater than a predetermined value.

If the steering angle determination unit 37 determines that the steering angle of the host vehicle is equal to or greater than the predetermined value, the warning device control unit 38 activates the warning device 40. This operation allows the warning device 40 to make a warning to the other vehicle in the vicinity of the host vehicle. In contrast, if the steering angle determination unit 37 determines that the steering angle of the host vehicle is less than the predetermined value, the warning device control unit 38 does not activate the warning device 40. Thus, the warning device 40 does not make a warning.

If the driver of the host vehicle does not activate the direction indicator in spite of approaching a position to turn on the route, and if the steering angle of the host vehicle is equal to or greater than the predetermined value, these operations enable waning to the other vehicle. It can thus be expected that the driver of the other vehicle, such as a following vehicle, steps on the brake or accelerator or turns the steering wheel, resulting in avoidance of collision.

The collision avoidance system according to the fourth embodiment considers that a collision hardly occurs in the case where the steering angle of the host vehicle is less than the predetermined value, which differs from the first embodiment. Since a warning is not required in this case, the warning device 40 does not make a warning. Thus, making of unnecessary warning can be prevented.

Modified examples of the collision avoidance system according to the present embodiment will now be described.

MODIFIED EXAMPLE 1

The collision avoidance system may use a smartphone (not illustrated) instead of the navigation device 21, so that an application in the smartphone is activated to set a route and that the smartphone provides navigation. In this case, the route information acquisition unit 31 acquires the route information from the smartphone. The host vehicle position information acquisition unit 32 may acquire the host vehicle position information with a GPS function of the smartphone.

MODIFIED EXAMPLE 2

The warning device 40 may make a warning to the other vehicle and may make a warning to the driver of the host vehicle 10. This configuration can prevent the driver from forgetting to activate the direction indicator.

MODIFIED EXAMPLE 3

If the direction indicator is off, the warning device 40 may be activated to make a warning to the other vehicle, without comparing the set route with the current position of the host vehicle and regardless of the steering angle being equal to or greater than the predetermined value. This configuration enables the warning device 40 to be activated to make a warning to the other vehicle even if the host vehicle travels off the route.

MODIFIED EXAMPLE 4

In Modified example 3, if the steering angle is equal to or greater than the predetermined value, the direction indicator is off, and the travel speed of the host vehicle is equal to or greater than a predetermined value (for example, 10 km/hour or greater), the warning device 40 may be activated to make a warning to the other vehicle. This configuration can prevent the warning device 40 from being activated to make a warning when the steering angle is equal to or greater than the predetermined value for parking the vehicle in a garage or parallel parking the vehicle.

Collision Avoidance Method

Figure 11:
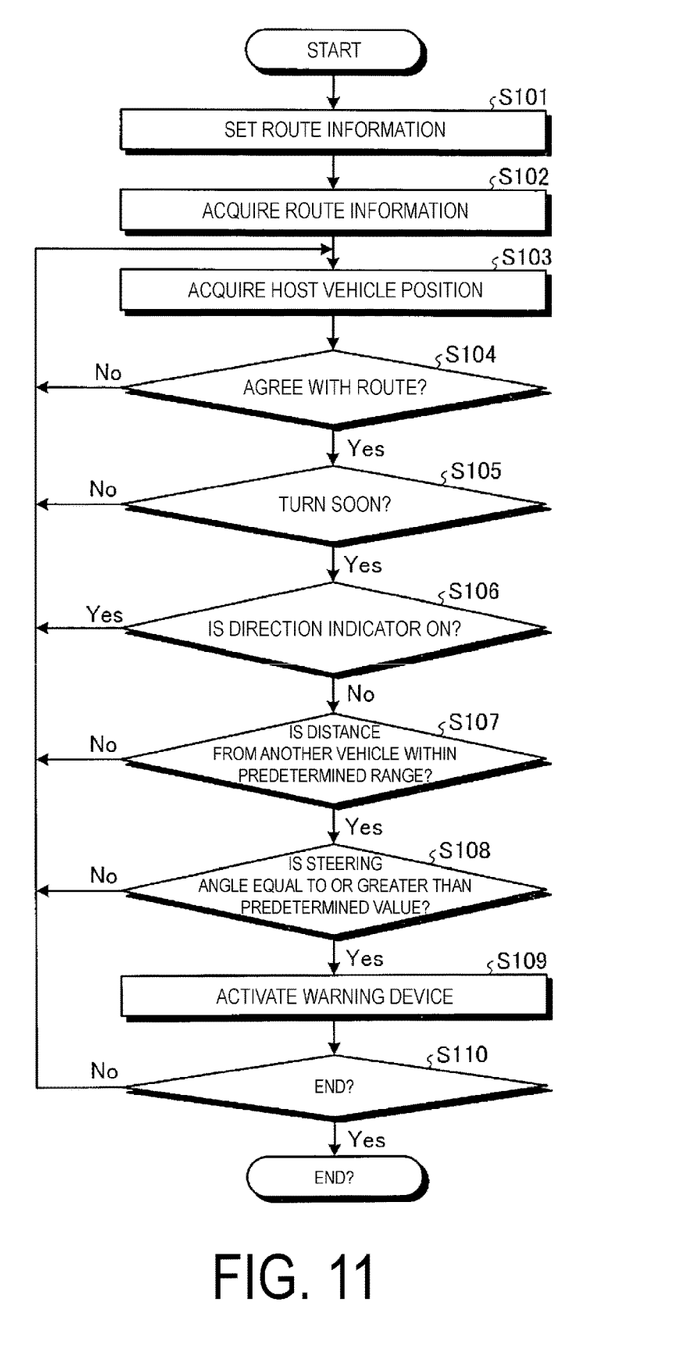
FIG. 11 is a flowchart illustrating an example of a collision avoidance method carried out by the collision avoidance system according to the present embodiment.

FIG. 11 is a flowchart illustrating an example of a collision avoidance method carried out by the collision avoidance system according to the present embodiment. As illustrated in FIG. 11, route information indicating a route to be traveled by the host vehicle is set with the navigation device 21 (Step S101).

The route information acquisition unit 31 acquires the set route information (Step S102). The host vehicle position information acquisition unit 32 acquires host vehicle position information (Step S103).

The comparison unit 33 compares the route information acquired by the route information acquisition unit 31 with the host vehicle position information acquired by the host vehicle position information acquisition unit 32 (Step S104).

If the host vehicle position information agrees with a position on the route as a result of the comparison at the comparison unit 33 (Step S104: Yes), the turning determination unit 34 determines whether the host vehicle approaches a position to turn (Step S105).

If the turning determination unit 34 determines that the host vehicle approaches a position to turn (Step S105: Yes), the direction indicator determination unit 35 determines whether the direction indicator of the host vehicle is on or off on the basis of a detection result from the direction indicator detection unit 22 (Step S106).

If the direction indicator determination unit 35 determines that the direction indicator of the host vehicle is not on (is off) (Step S106: No), the distance determination unit 36 determines whether the distance between the host vehicle and another vehicle traveling in the vicinity of the host vehicle, measured by the distance measurement unit 23, is within a predetermined range (Step S107).

If the distance determination unit 36 determines that the distance between the host vehicle and the other vehicle traveling in the vicinity of the host vehicle is within the predetermined range (Step S107: Yes), the steering angle determination unit 37 determines whether the steering angle of the host vehicle detected by the steering angle detection unit 24 is equal to or greater than a predetermined value (Step S108).

If the steering angle determination unit 37 determines that the steering angle of the host vehicle is equal to or greater than the predetermined value (Step S108: Yes), the warning device control unit 38 activates the warning device 40 to make a warning (Step S109).

Thereafter, it is determined whether navigation from the navigation device 21 ends (Step S110). If the navigation ends (Step S110: Yes), the procedure of this system ends. The case where the navigation ends is, for example, a case where the host vehicle arrives at the destination.

If the navigation continues (Step S110: No), the procedure of this system goes back to Step S103 and continues.

If the host vehicle position information disagrees with a position on the route as a result of the comparison at the comparison unit 33 in Step S104 (Step S104: No), if the turning determination unit 34 determines that the host vehicle does not approach a position to turn in Step S105 (Step S105: No), if the direction indicator determination unit 35 determines that the direction indicator of the host vehicle is on in Step S106 (Step S106: Yes), if the distance determination unit 36 determines that the distance between the host vehicle and the other vehicle traveling in the vicinity of the host vehicle is outside the predetermined range in Step S107 (Step S107: No), or if the steering angle determination unit 37 determines that the steering angle of the host vehicle is not equal to or greater than the predetermined value (is less than the predetermined value) in Step S108 (Step S108: No), the procedure goes back to Step S103 and continues.

The processes in Steps S107, S108 may be omitted. In the case of omitting the processes in Steps S107, S108 (corresponds to the first embodiment), if the position of the host vehicle agrees with a position on the route, and the position of the host vehicle approaches a position to turn on the route, when it is detected that the direction indicator is off, a warning operation is performed toward the other vehicle traveling in the vicinity of the host vehicle.

In the case of performing the process in Step S107 and omitting the process in Step S108 (corresponds to the second embodiment), if the position of the host vehicle agrees with a position on the route, the position of the host vehicle approaches a position to turn on the route, it is detected that the direction indicator is off, and the distance between the host vehicle and the other vehicle is within the predetermined range, a warning operation is performed toward the other vehicle traveling in the vicinity of the host vehicle.

In the case of omitting the process in Step S107 and performing the process in Step S108 (corresponds to the fourth embodiment), if the position of the host vehicle agrees with a position on the route, the position of the host vehicle approaches a position to turn on the route, it is detected that the direction indicator is off, and the steering angle of the host vehicle is equal to or greater than the predetermined value, a warning operation is performed toward the other vehicle traveling in the vicinity of the host vehicle.

The invention claimed is:

1. A collision avoidance system comprising:
   a route information acquisition unit acquiring route information indicating a preset route;
   a host vehicle position acquisition unit acquiring host vehicle position information indicating a position of a host vehicle;
   a direction indicator detection unit detecting whether a direction indicator providing advance notice of a traveling direction of the host vehicle is on or off;
   a warning device performing a warning operation pertaining to a warning directed at another vehicle traveling in a vicinity of the host vehicle, the another vehicle including a following vehicle traveling behind the host vehicle and a vehicle traveling on a left or right side of the host vehicle; and
   a control unit controlling the warning device on a basis of the information acquired by the route information acquisition unit and the host vehicle position acquisition unit and a detection result from the direction indicator detection unit;
   the control unit controlling the warning device to perform the warning operation for the another vehicle upon agreement of the position of the host vehicle with a position on the route to be traveled by the host vehicle, approach of the position of the host vehicle to a position to turn on the route, detection of the direction indicator being off at the direction indicator detection unit, a steering angle being equal to or greater than a predetermined value, and a travel speed of the host vehicle being equal to or greater than a predetermined value.

2. The collision avoidance system according to claim 1, further comprising:
   a distance measurement unit measuring a distance between the host vehicle and the another vehicle; wherein
   the control unit controls the warning device not to perform the warning operation upon measurement of the distance being outside a predetermined range at the distance measurement unit.

3. The collision avoidance system according to claim 2, wherein the distance measurement unit comprises a radar unit outputting a measurement signal based on a reflected wave of an electromagnetic wave emitted toward the another vehicle as a measurement result.

4. The collision avoidance system according to claim 2, wherein the distance measurement unit comprises a photographing unit photographing the another vehicle and outputs an image signal based on an image acquired by the imaging unit as a measurement result.

5. The collision avoidance system according to claim 1, further comprising:
a steering angle detection unit detecting a steering angle of the host vehicle; wherein
the control unit controls the warning device to perform the warning operation upon detection of the steering angle being equal to or greater than a predetermined value at the steering angle detection unit, and controls the warning device not to perform the warning operation upon detection of the steering angle being less than the predetermined value at the steering angle detection unit.

6. The collision avoidance system according to claim 1, wherein the warning operation includes at least one of a predetermined display operation directed at the another vehicle and a predetermined sound outputting operation directed at the another vehicle.

7. The collision avoidance system according to claim 1, wherein the warning operation includes an operation of transmitting, to the another vehicle, a signal activating another warning device provided in the another vehicle.

8. The collision avoidance system according to claim 3, wherein the distance measurement unit comprises a photographing unit photographing the another vehicle and outputs an image signal based on an image acquired by the imaging unit as a measurement result.

9. The collision avoidance system according to claim 8, further comprising:
a steering angle detection unit detecting a steering angle of the host vehicle; wherein
the control unit controls the warning device to perform the warning operation upon detection of the steering angle being equal to or greater than a predetermined value at the steering angle detection unit, and controls the warning device not to perform the warning operation upon detection of the steering angle being less than the predetermined value at the steering angle detection unit.

10. The collision avoidance system according to claim 9, wherein the warning operation includes at least one of a predetermined display operation directed at the another vehicle and a predetermined sound outputting operation directed at the another vehicle.

11. The collision avoidance system according to claim 10, wherein the warning operation includes an operation of transmitting, to the another vehicle, a signal activating another warning device provided in the another vehicle.

12. A collision avoidance method comprising the steps of:
acquiring route information indicating a preset route;
acquiring host vehicle position information indicating a position of a host vehicle;
detecting whether a direction indicator providing advance notice of a traveling direction of the host vehicle is on or off; and
performing a warning operation pertaining to a warning directed at and for another vehicle traveling in a vicinity of the host vehicle upon agreement of the position of the host vehicle with a position on the route to be traveled by the host vehicle, approach of the position of the host vehicle to a position to turn on the route, detection of the direction indicator being off, a steering angle being equal to or greater than a predetermined value, and a travel speed of the host vehicle being equal to or greater than a predetermined value;
wherein the another vehicle includes a following vehicle traveling behind the host vehicle and a vehicle traveling on a left or right side of the host vehicle.

* * * * *